United States Patent [19]

Ludwig et al.

[11] Patent Number: 5,486,730
[45] Date of Patent: Jan. 23, 1996

[54] ROTOR ASSEMBLY

[75] Inventors: George A. Ludwig; David G. Teraji, both of San Diego, Calif.

[73] Assignee: Solar Turbines Incorporated, San Diego, Calif.

[21] Appl. No.: 33,483

[22] Filed: Mar. 18, 1993

[51] Int. Cl.[6] .................................................. H02K 21/12
[52] U.S. Cl. ........................ 310/156; 310/42; 310/261; 310/271; 156/293; 464/179
[58] Field of Search ............................. 310/156, 42, 191, 310/209, 261, 271; 464/179; 156/293

[56] References Cited

U.S. PATENT DOCUMENTS

| 2,677,259 | 5/1954 | Donant | 310/190 U X |
|---|---|---|---|
| 3,396,291 | 8/1969 | Somerville | 310/261 U X |
| 4,045,696 | 8/1977 | Lutz | 310/156 U X |
| 4,543,506 | 9/1985 | Kawada | 310/156 |
| 4,674,178 | 6/1987 | Patel | 29/598 |
| 4,713,569 | 12/1987 | Schwartz | 310/156 |
| 4,748,359 | 5/1988 | Yahara | 310/156 |
| 4,918,802 | 4/1990 | Schaefer | 29/598 |
| 4,920,295 | 4/1990 | Holden | 310/209 |

FOREIGN PATENT DOCUMENTS

| 0212552 | 3/1987 | European Pat. Off. . | |
|---|---|---|---|
| 2504312 | 3/1588 | France . | |
| 1053083 | 3/1959 | Germany | 310/209 |
| 8427704 | 3/1986 | Germany . | |
| 3224904 | 11/1986 | Germany . | |
| 784442 | 10/1957 | United Kingdom | 310/209 |

OTHER PUBLICATIONS

Patent Abstracts of Japan–vol. 5, No. 125 (E–69) (797) 12 Aug. 1981.

*Primary Examiner*—R. Skudy
*Attorney, Agent, or Firm*—Larry G. Cain

[57] ABSTRACT

Past methods and apparatus for manufacturing a rotor assembly have been used to provide rotor assemblies for rotating electric machines. Many of these electric machines rotate at low speeds. The present method and apparatus for manufacturing a rotor assembly can be used to make a rotor assembly to be used at high speeds. The rotor assembly includes a shaft having a frustoconical mounting surface defined thereon and having a plurality of magnets attached to the frustoconical mounting surface. A cover having a frustoconical inner surface surrounds the magnets and compressively secures the magnets to the shaft. The compressive forces applied by the cover and the adhesive used to secure the magnets insuring that a positive contact pressure exists between the magnets and the shaft during operation of the electric machine.

12 Claims, 4 Drawing Sheets

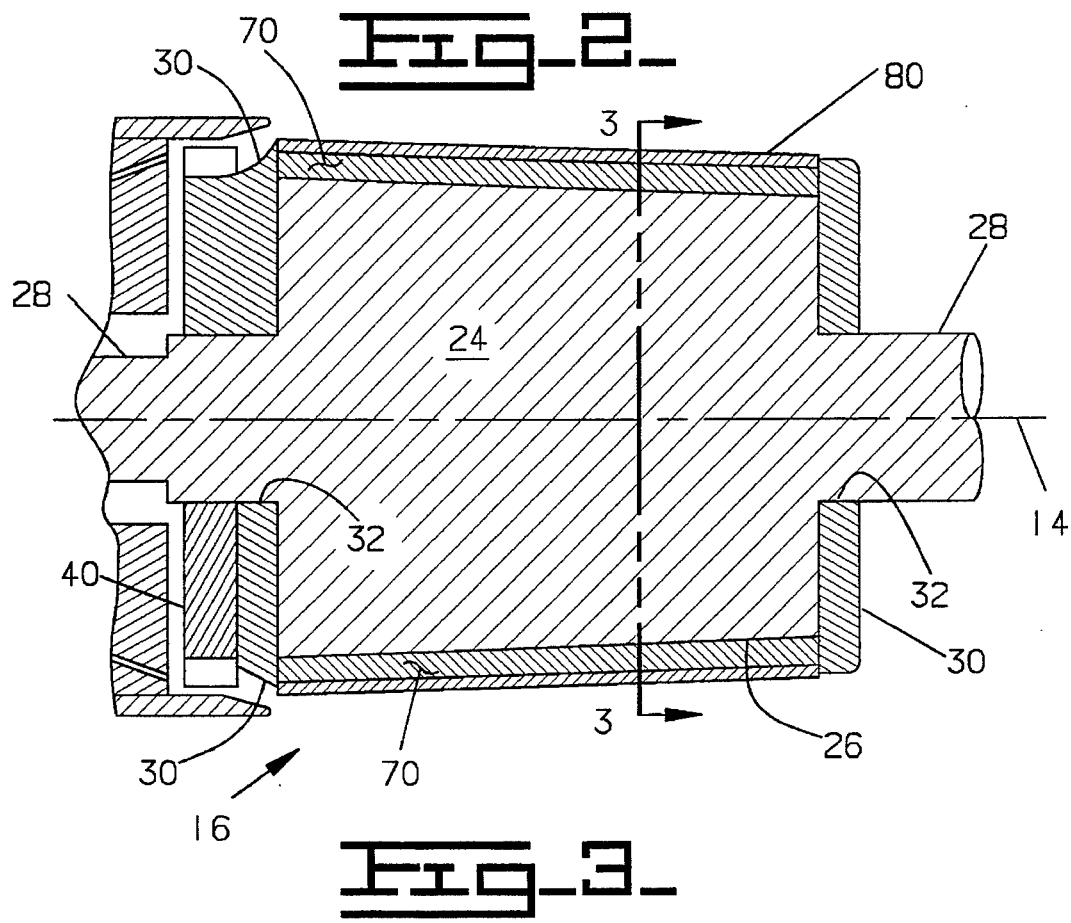
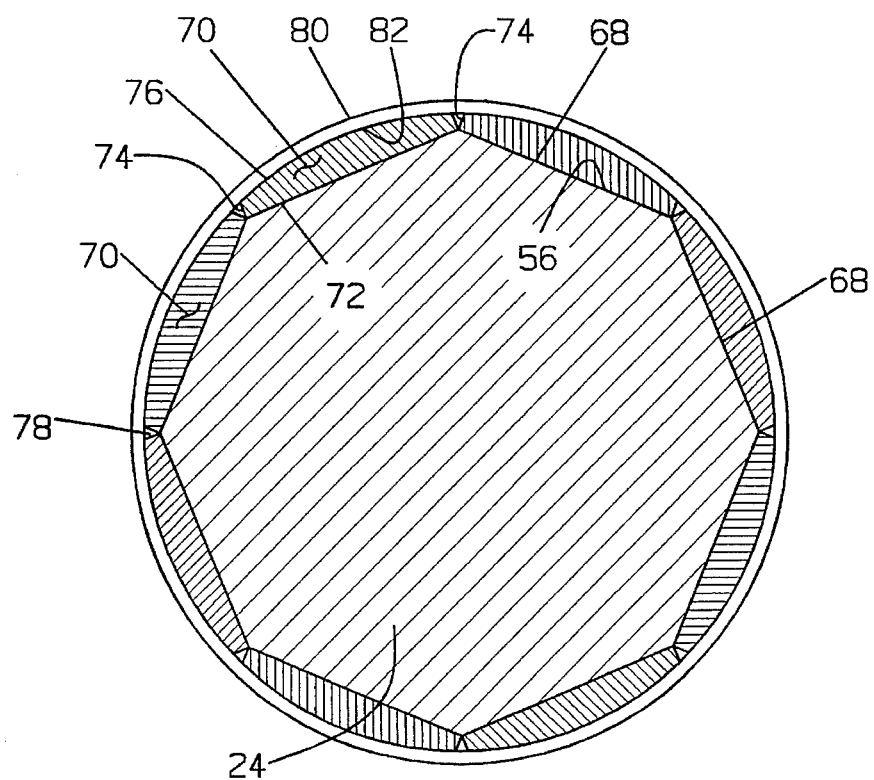

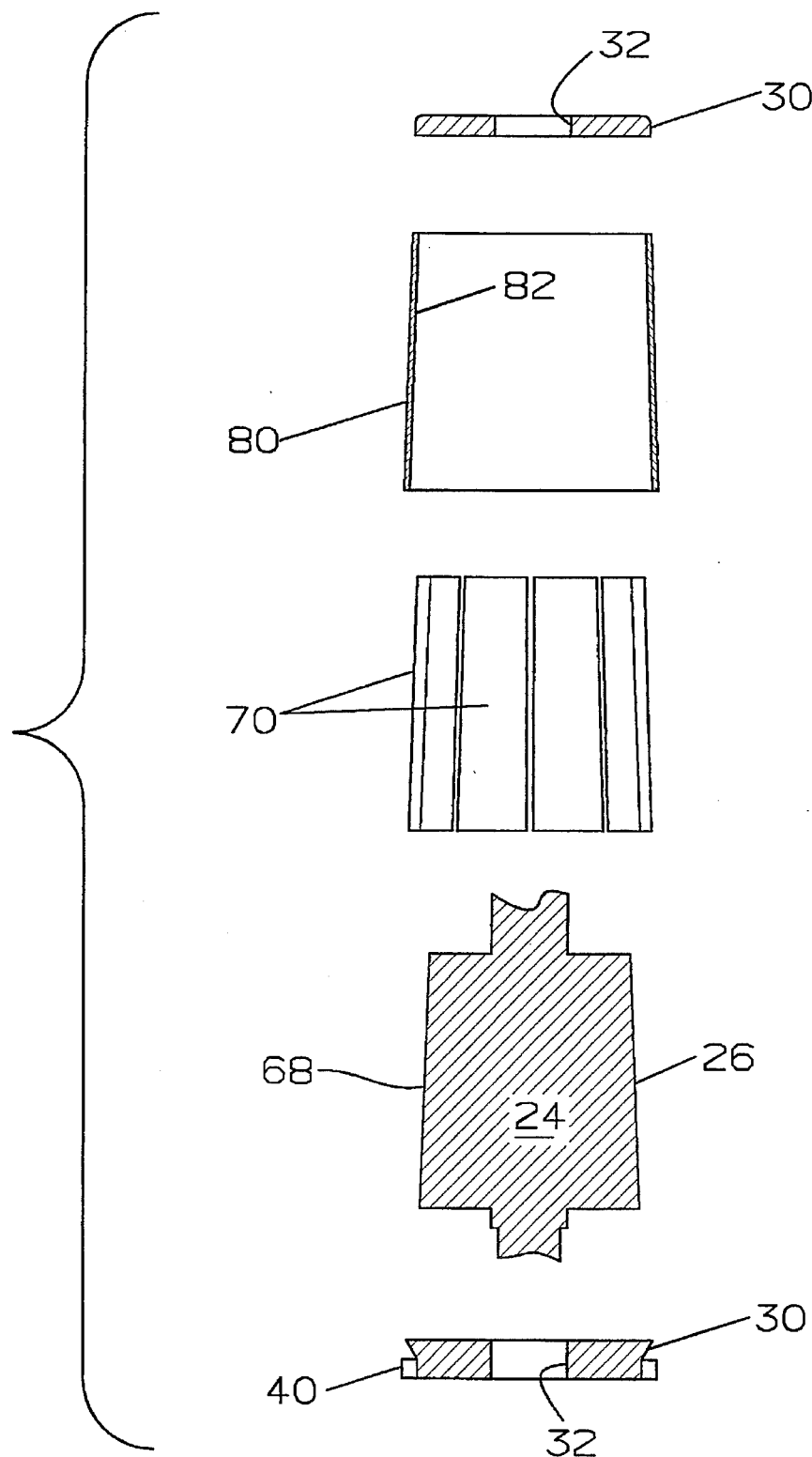
Fig_4

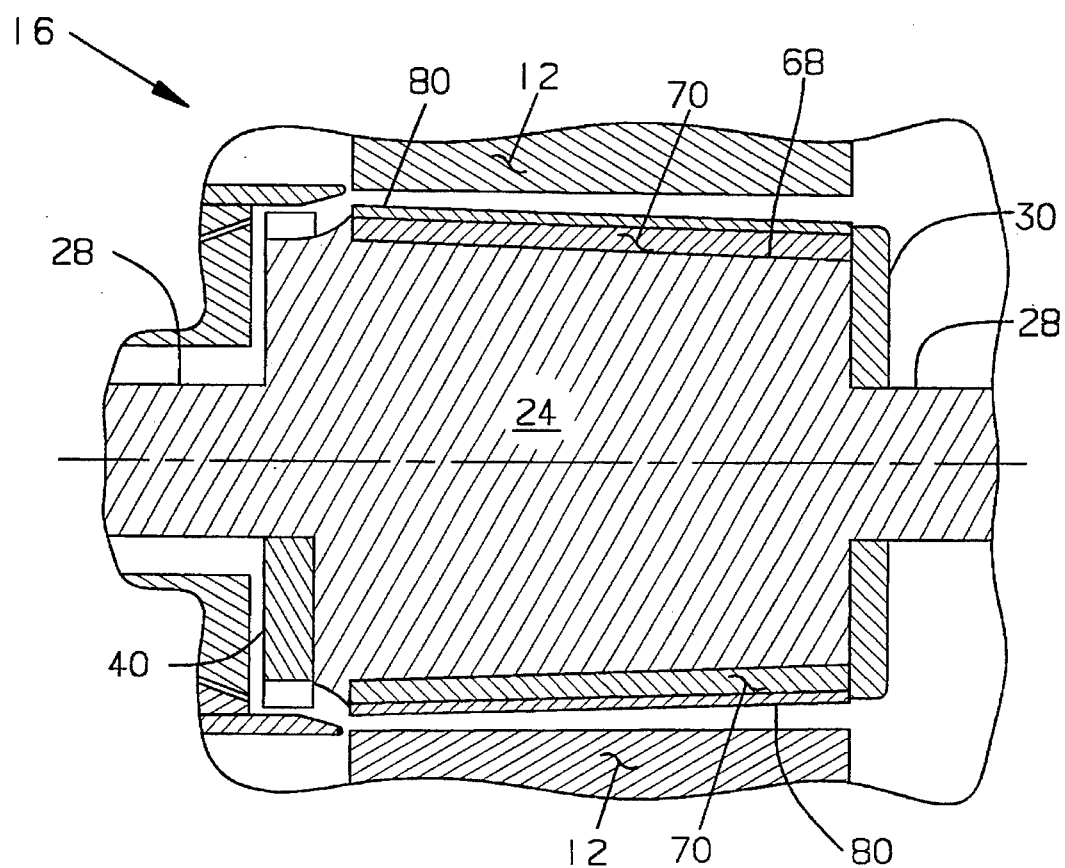
Fig_5_

ROTOR ASSEMBLY

TECHNICAL FIELD

This invention relates generally to an electric machine and more particularly to a method and apparatus for making a rotor assembly having magnets attached thereto.

BACKGROUND ART

Permanent magnet rotors are frequently used in electric machines such as motors and generators. In many applications, permanent magnets are secured to a rotor hub or shaft by any of a variety of means. Care must be taken to assure that such securement prevents the magnets from moving either axially or radially. If axial movement is permitted, one or more magnets may not properly align with an armature with the consequence being that the generator efficiency diminishes. If radial movement occurs, the probability of interfering contact between the rotor and the stator exists, and the resulting frictional drag and/or damage to generator parts comes into existence.

As may be expected, securement of magnets increasingly becomes a problem with increased rotor speeds due to the increasing forces tending to cause magnet movement, particularly in the radial direction, with the increasing centrifugal force accompanying increasing rotational speeds. Thus, in many instances where there are relatively high speeds, and permanent magnet rotors are required, securement of the magnets against both axial and radial displacement is accomplished by sandwiching the magnets between side plates which prevent axial displacement and by winding a fibrous material such as carbon fiber about the peripheries of the side plates and the magnets to provide radial retention. An example of this approach is disclosed in U.S. Pat. No. 4,674,178 issued Jun. 23, 1987 to Navinchandra R. Patel. Patel's patent discloses a rotor assembly having the permanent magnets attached thereto by a fibrous winding which is devoid of loose or potentially loose fibers and ends of the windings. The permanent magnets are disposed in a hub and filler material is located between adjacent ones of the magnets. Axially spaced, opposite side plates are located on the hub to sandwich the magnets and the filler material.

Another method and apparatus for assembling a rotor is disclosed in U.S. Pat. No. 4,918,802 issued Apr. 24, 1990 to Edward J. Schaefer. Schaefer's patent discloses a rotor assembly having a plurality of permanent magnet segments and an outer sleeve or cylinder. A thin-walled metal cylinder is fashioned and arcuate magnet segments are positioned in angularly spaced relation against the interior surface of the cylinder. The segments are displaced radially outwardly to stretch or expand the outer cylinder, and the segments are then supported in the outwardly displaced position. The segments may be displaced by a variety of devices including an expanding mandrel, tapered part of a shaft and a tapered ring.

Another problem encountered with rotors of the type disclosed is in the difficulty in achieving a balance about the intended rotational axis of the rotor. When balance can not be achieved, operation of the generator containing the rotor will result in the generation of vibration which can deleteriously affect the life of bearings and other generator components.

The present invention is directed to overcoming one or more of the above problems.

DISCLOSURE OF THE INVENTION

In one aspect of the invention, a rotor assembly is comprised of a shaft having a first end portion and a second end portion and a frustoconical surface defined thereon interposed the first and second end portion. A plurality of magnets are attached to the frustoconical surface. A cover has a preestablished inner frustoconical surface in contact with the magnets and a pair of end flanges are attached to the shaft.

In another aspect of the invention, a method of manufacturing a rotor assembly including a shaft having a frustoconical surface defined thereon, a plurality of magnets, a cover and at least an end flange is comprised of the steps of attaching the plurality of magnets to the frustoconical surface of the shaft. Positioning the cover about the plurality of magnets and attaching the end flange to the shaft.

BRIEF DESCRIPTION OF THE DRAWINGS

FIG. 2 is an enlarged sectioned view of a rotor assembly and a portion of an outer case;

FIG. 3 is a sectional view taken along lines 3—3 of FIG. 2;

FIG. 4 is an exploded assembly view of the rotor assembly; and

FIG. 5 is an enlarged sectional view of an alternate embodiment of a rotor assembly and a portion of an outer case of the present invention.

BEST MODE FOR CARRYING OUT THE INVENTION

Figure 1:
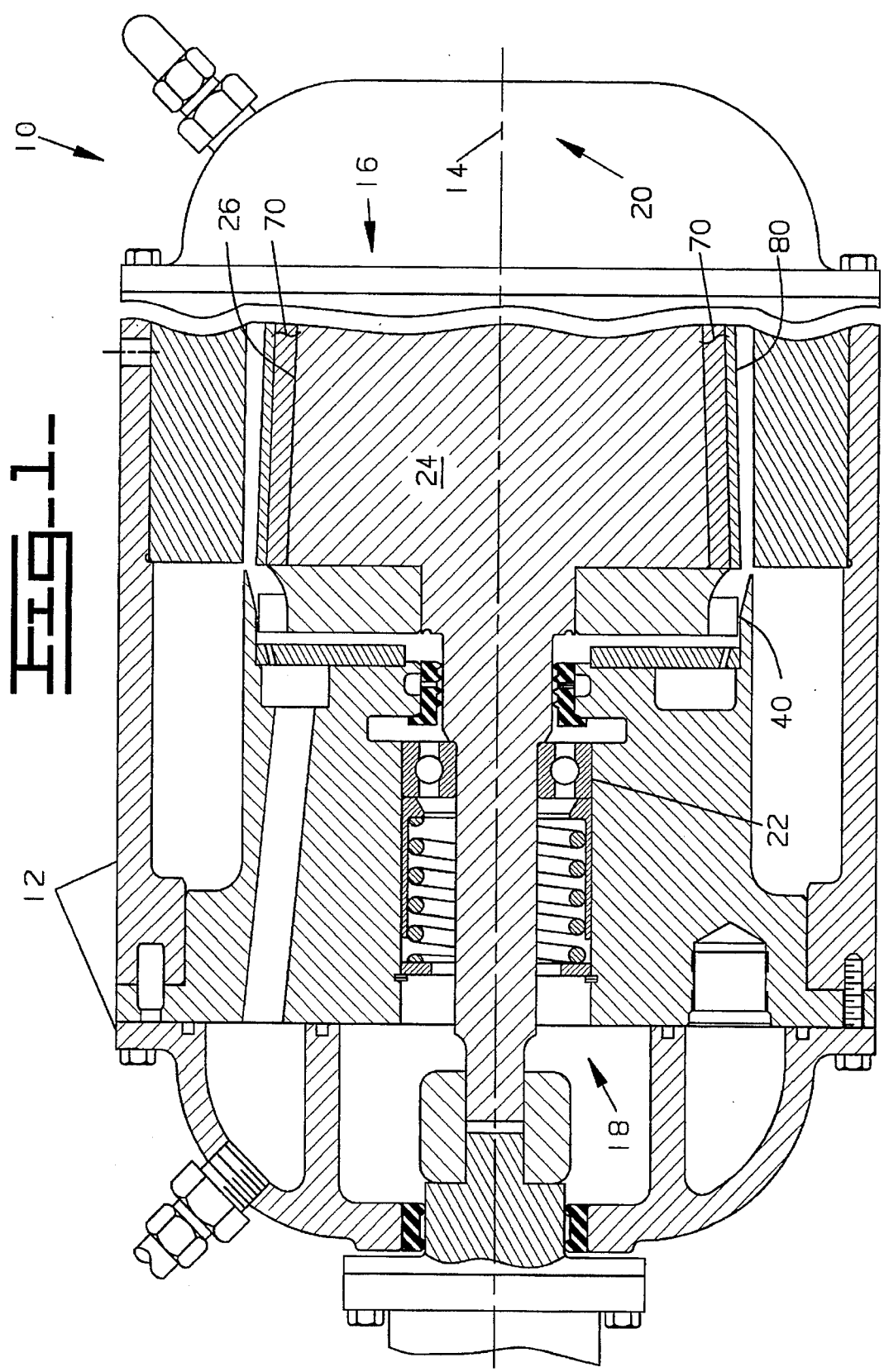
FIG. 1 is a partially sectioned side view of an electric machine embodying the present invention.

Referring to FIG. 1, an electric machine 10 such as a generator or motor is shown. The machine 10 includes a generally cylindrical multipiece outer case 12 having a central axis 14. Rotatably positioned within the case 12 and centered on the axis 14 is a rotor assembly 16 being supported at a first end portion 18 and a second end portion 20 in a conventional manner, such as by a plurality of bearings 22, of which only one is shown. The rotor assembly 16 is either drivingly connected to a power source, if used as a generator, or if used as a motor is connected to a mechanical mechanism such as a compressor or gear drive, not shown.

In this application as further shown in FIGS. 1 and 2, the rotor assembly 16 includes a shaft 24 having a mounting surface 26 thereon and a necked down portion 28 at each end on which the bearings 22 are positioned. A pair of end flanges 30 having a bore 32 therein are pressed onto the necked down portion 28 at each of the first end portions 18 and the second end portion 20. The mounting surface 26 is interposed the first end portion 18 and the second end portion 20 and between the end flanges 30 has a generally frustoconical contour and has a preestablished length. The frustoconical contour has a preestablished taper which, in this application, is between about 1 to 2 degrees.

In this application, the rotor assembly 16 further includes an expander turbine 40 formed as a part of one of the end flanges 30. As best shown in FIG. 1 and in the top portion of FIGS. 2 and 5, the expander turbine 40 and the end flange 30 are integral. As an alternative best shown in the bottom portion of FIG. 2, the expander turbine 40 and the end flanges 30 can be separate pieces which are pressed onto the shaft 24. As a further alternative best shown in the bottom portion of FIG. 5, the end flange 30 can be integral with the shaft 24 and the expander turbine 40 can be a separate piece which is pressed onto the shaft 24.

As further shown in FIG. 3, the frustoconical contour of the mounting surface 26 includes a plurality of generally rectangular flat portions 68. In this application, eight (8) flat portions are used. Each of the generally rectangular flat portions 68 has a length which extends between the end flanges 30 and has a preestablished width. A permanent magnet 70 is attached to each of the flats using a glue having the characteristics of being pliable and non-hardening at low temperatures, such as a room temperature vulcanizing material such as adhesive.

As an alternative, the magnets could be energizable rather than being permanent magnets 70 without changing the gist of the invention. In this application as best shown in FIG. 3, each of the magnets 70 has a flat rectangular base surface 72 defined thereon which is attached to respective rectangular flat portions 68 of the frustoconical contour of the mounting surface 26. A cross-section of each magnet 70 includes the base surface 72, a pair of sides 74 extending therefrom and an arcuate surface 76 connected between the pair of sides 74. In the assembled position, a gap 78 is formed between respective sides 74 of adjacent magnets 70. The magnets 70, when attached to the flat portion 68, are each in contact with the adjacent magnets 70 at the junctures between the sides 74 and the base surface 72. As an alternative, a small gap could be provided between corresponding sides 74 of adjacent magnets 70. If the gap exists it will be filled with glue. Positioned about the arcuate surface 76 of each of the magnets 70 is a non-magnetic cover 80. As an alternative shown in FIG. 5, the rotor assembly 16 could include an integral formed shaft 24 and one of the end flange 30. The second end flange 30 would be attached to the integral formed shaft 24 after attachment of the magnets 70 and the cover 80.

In this application, the cover 80 is made-up of a composite material, such as being formed by winding a fiber, such as a carbon fiber in a curable resin such as epoxy resin, circumferentially about a tapered or frustoconical anvil having a preestablished major diameter and a preestablished minor diameter. The winding about the anvil results in the cover 80 having a preestablished inner frustoconical surface 82. The cover 80 has a preestablished length being generally equal to the length of the frustoconical contour of the mounting surface 26 and has a preestablished thickness. As an alternative, the cover 80 could be made of a non-magnetic metal without changing the concept.

As best shown in FIG. 4, the rotor assembly 16 is assembled as follows. The mounting surface 26 of the shaft 24 has a room temperature vulcanizing material applied thereto and each of the magnets 70 are attached to the generally rectangular flat portions 68. As an alternative each of the rectangular base surface 72 of each of the magnets 70 and the mounting surface 26 could have the vulcanizing material adhesive applied thereto and the magnets 70 would be attached to each of the generally rectangular flat portions 68 on the frustoconical contour of the mounting surface 26. Thus, the magnets 70 are fixedly attached and positioned on the shaft 24. The shaft 24 with the magnets 70 attached thereto and the arcuate surface 76 of the magnets 70 are formed, such as by grinding, to have a generally frustoconical outer configuration. As best shown in FIGS. 1, 2, 4 and 5, the forming process results in the magnets 70 nearest the end having the larger diameter of the frustoconical outer configuration to have a thickness which is less than the thickness of the magnets 70 near the end of the smaller diameter of the frustoconical outer configuration. The preestablished inner frustoconical surface 82 of the cover 80 is slightly smaller than and generally matches the frustoconical outer configuration of the formed arcuate surfaces 76 of the magnets 70. Using a proper lubrication which is applied to the arcuate surfaces 76 of the magnets 70, the cover 80 is pressed over the magnets 70 until the ends are generally aligned with the ends of the magnets 70. The sleeve 80 is pushed axially over the frustoconical shaft until a predetermined diameter of the sleeve has increased its diameter by an amount which will yield the prescribed prestress required in the sleeve. The tapered rotor makes this press-fit assembly possible. After assembly, the ends of the cover 80 can be trimmed if necessary. Thus, after the cover 80 and the shaft 24 with the magnets 70 attached thereto are assembled, a predetermined prestress will exist between the cover 80 and the magnets 70. The above described assembly procedure provides the rotor assembly 16 with the structural integrity to operate at the desired speed. Variations in the thickness of the cover 80 as well as material selection for material properties can produce a variety of prestress conditions to operate in any given operating environment. After the cover 80 has been secured to the magnets 70, the end flanges 30 are heated and pressed onto the shaft 24. To prevent relative movement between parts, suitable locking of the end flange 30 can be accomplished by staking, lock pins or other means. If the integral shaft 24 and end flange 30 is use, only one end flange is pressed onto the shaft.

Industrial Applicability

In operation, the rotor assembly 16 is assembled within the outer case 12 and the electric machine 10 is ready for operation. The electric machine 10 will be described as functioning as a generator for descriptive purposes only.

A demand for electrical energy is sent to the generator. The rotor assembly 16 is driven by an external source and is rotated. The permanent magnets 70 on the rotor assembly 16 are caused to rotate within the outer case 12 which includes the stator assembly and produces an electrical current as periodic variation of the flux of the magnetic lines of force passing through the loop causes a flow of electrical current.

As a higher demand for electrical energy is required, the speed of rotation of the rotor assembly 16 is increased. The structural arrangement of the rotor assembly 16 allows the speed to increase and the force caused by centrifugal action to be resisted. For example, as the speed increases the permanent magnets 70 attempt to lift or become separated from the shaft 24. The prestresses within the rotor assembly 16 resist these forces. The cover 80 confines the radial movement of the magnets 70 and the cover exert the prestress or force on the magnets 70 to further retain the contact between the generally rectangular flat portions 68 on the shaft and flat rectangular base surface 72 on the permanent magnets 70. Thus, the operating mode of the high speed generator can be functionally attained with the structural relationship of the rotor assembly 16.

A further modification to the rotor assembly 16 has increased the efficiency during operation of the generator. For example, the magnets 70 have the preestablished thickness at the larger diameter of the frustoconical outer configuration which is less than the preestablished thickness at the smaller diameter. The results of the varying thickness being that the flux density at the larger diameter is less than the flux density at the smaller diameter. With the frustoconical configuration of the rotor assembly 16, a higher flux density is needed to span between the rotor assembly 16 and the outer case 12. As an alternative, although not as efficient, the thickness of the magnets 70 could be uniform.

The assembly of the rotor assembly 16 has greatly reduced the cost of manufacturing and reduced the number of piece parts required to make up the rotor assembly 16. For example, the frustoconical surface 26 on the shaft 24 with the magnets 70 attached thereto and ground to a frustoconical shape and the assembly of the cover 80 about the magnets 70 can be done quicker, more reliably and without expending as much energy. The convention steps of cooling the shaft 24 with the magnets 70 attached thereto and the heating of the cover 80 are eliminated. The frustoconical shape of the mounting surface 26 and the frustoconical contour of the arcuate surfaces 76 of the magnets 70 attached thereto and the frustoconical inner surface 82 of the cover 80 retain the ability to stress the cover 80 about the magnets 70 after pressing the cover 80 in place. The integral end flange 30 and the shaft 24 eliminates the pressing or bolting of the flange 30 to the shaft 24 and the pressing of the single end flange 30 to the shaft 24 eliminates the bolting of the flange 30.

The rotor assembly 16 can withstand high speeds and provides an economically acceptable cost for such an assembly. The design allows the cover 80 to be wound in a normal fashion on a tapered mandrel without requiring it to be prestressed. Hence, material scrap and cost compared to prestressed designs is improved. Furthermore, improved reliability of the prestressed design results from the unique structure and preestablished sizing of the arcuate surfaces 76 of the magnets 70 and the inner surface 82 of the cover 80. The rotor assembly 16 further provides positive contact pressure preventing lift-off and detachment between the magnets 70 and the shaft 24. The elimination of bolts or fasteners reduces the air resistance during operation of the rotor assembly 16, resulting in increased generator efficiency. Likewise, the tapered rotor configuration improves generator efficiency. The positive assembly further reduces high speed vibrations.

Other aspects, objects and advantages of this invention can be obtained from a study of the drawings, disclosure and the appended claims.

We claim:

1. A rotor assembly comprising:
    a shaft having a first end portion and a second end portion and having a frustoconical surface defined thereon interposed the first and second end portions;
    a plurality of magnets being attached to the frustoconical surface forming a generally frustoconical outer configuration wherein said plurality of magnets have a thickness at a larger end being less than a thickness at a smaller end of the frustoconical outer configuration;
    a cover having a preestablished inner frustoconical surface being in contact with the magnets; and
    a pair of end flanges being attached to the shaft.

2. The rotor assembly of claim 1 wherein said plurality of magnets are secured to the frustoconical surface.

3. The rotor assembly of claim 2 wherein said contact of the inner frustoconical surface of the cover with plurality of the magnets further secures the plurality of magnets in attachment to the shaft.

4. The rotor assembly of claim 1 wherein said cover is made of a non-magnetic material.

5. The rotor assembly of claim 1 wherein said plurality of magnets have an arcuate surface in contact with the inner frustoconical surface of the cover.

6. The rotor assembly of claim 5 wherein said arcuate surface generally matches the preestablished inner frustoconical surface of the cover.

7. The rotor assembly of claim 1 wherein said frustoconical surface of the shaft includes a plurality of generally rectangular flat portions and each of said plurality of magnets includes a generally flat rectangular base surface and said generally flat rectangular base surface of the magnets is attached to each of the plurality of generally rectangular flat portions of the frustoconical surface of the shaft using a glue.

8. The rotor assembly of claim 7 wherein said glue is a room temperature vulcanizing material.

9. The rotor assembly of claim 8 wherein said glue has the characteristic of retaining some ductility at low temperatures.

10. The rotor assembly of claim 1 wherein said plurality of magnets further include a pair of sides and in an assembled position forming a gap between each of the plurality of magnets.

11. The rotor assembly of claim 10 wherein said gap has a glue positioned therein.

12. The rotor assembly of claim 11 wherein said glue is a room temperature vulcanizing material.

* * * * *